Feb. 25, 1947.  T. W. PAUL  2,416,403
GRAIN DRILL
Filed Nov. 10, 1943  4 Sheets-Sheet 3

INVENTOR.
TALBERT W. PAUL

ATTORNEYS

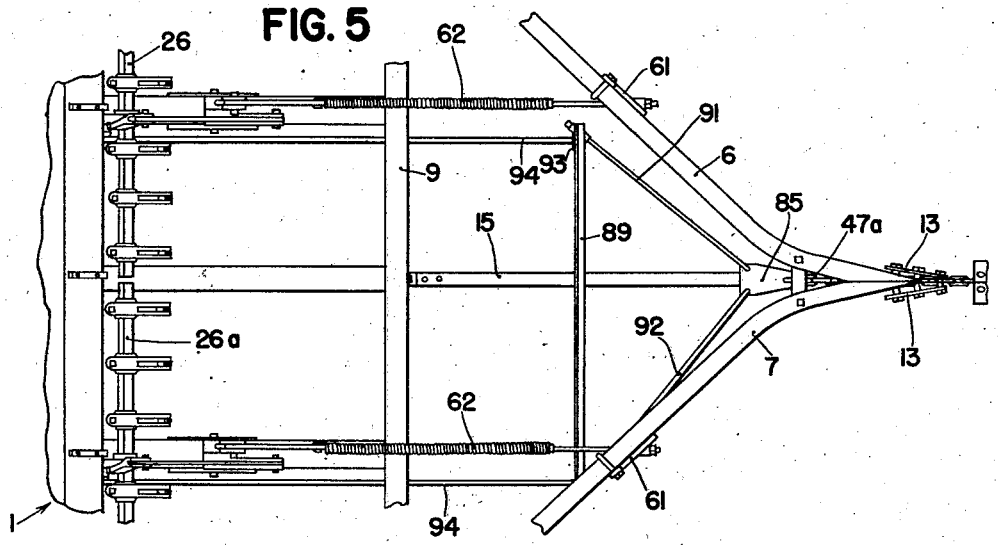
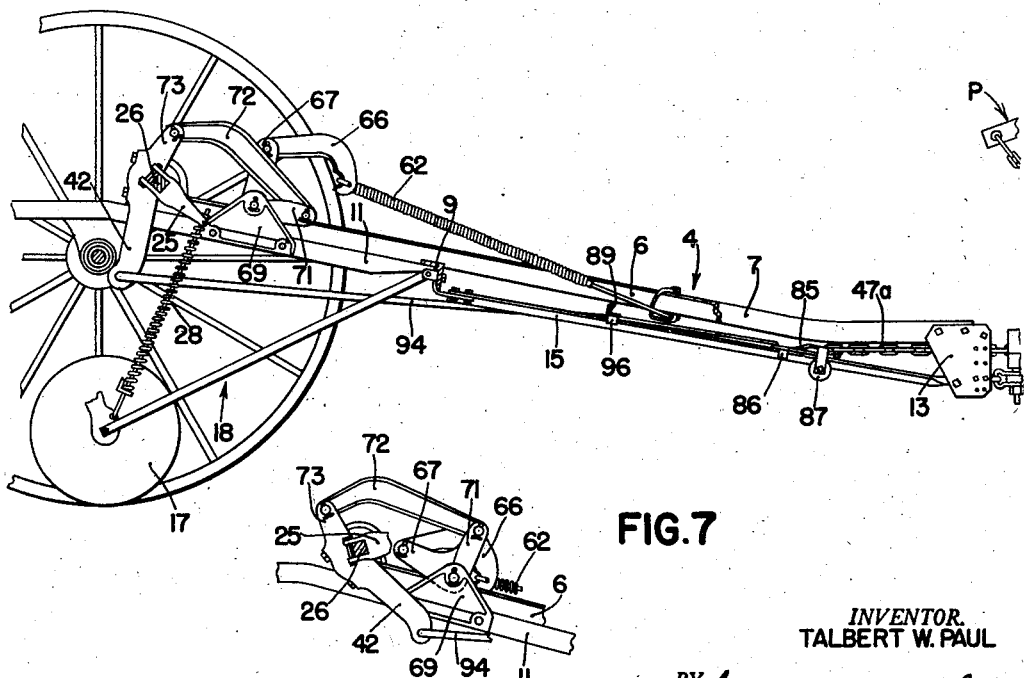

Patented Feb. 25, 1947

2,416,403

UNITED STATES PATENT OFFICE 2,416,403

GRAIN DRILL

Talbert W. Paul, Moline, Ill., assignor to The Van Brunt Manufacturing Co., Horicon, Wis., a corporation of Wisconsin Application November 10, 1943, Serial No. 509,940

11 Claims. (Cl. 111—59)

This invention relates generally to agricultural implements and more particularly to implements of the type having earth engaging or earth working tools of such character or number that external force may be necessary to hold the tools in their working positions.

The object and general nature of the present invention is the provision of an agricultural implement having an earth engaging tool or tools with which a loading spring or springs are associated and arranged so that the loading spring has its greatest effectiveness when the tools are in their ground engaging position and in which the effectiveness of the loading spring is reduced or substantially eliminated when the tools are raised, thereby relieving the raising mechanism of having to operate against the force of the loading spring or springs.

More specifically, it is a feature of this invention to provide a grain drill having a considerable number of furrow openers with loading spring mechanism for forcing the furrow openers into the ground, with mechanism responsive to movement of the raising means lifting the furrow openers into their raised position for decreasing and substantially eliminating the effect of the loading spring means as the furrow openers are lifted into their raised position. An arrangement of this kind is especially useful with the larger sizes of grain drills in which the number of furrow openers may exceed fifteen to twenty or more and in which considerable force is required to hold the furrow openers in the ground, especially under such conditions as where the drill may encounter a hard spot in the field. Particularly, it is a feature of this invention to provide loading spring means on the drill and which is initially biased so as to exert an appreciable force tending to hold the furrow openers down in their operating position, which force is more or less independent of the force for this purpose which would be available from the raising and lowering means, such as, for example, a power lift unit deriving energy from the propelling tractor, it being a further feature of the invention to provide mechanism whereby when the power lift unit is operated to raise the furrow openers it does not have to work against the loading spring means except through what is equivalent to only a part of the raising range of the power lift, and preferably during this part of the raising movement the raising action is augmented by the reaction of the multiplicity of pressure springs, there being one of such pressure springs for each furrow opener.

These and other objects and advantages of the present invention will be apparent to those skilled in the art after a consideration of the following detailed description, taken in conjunction with the accompanying drawings in which preferred embodiments of the invention have been illustrated.

In the drawings:

In Figure 1 the tools are shown in their lowered position;

Figure 5 is a fragmentary plan view of a modified form of the present invention;

Figure 6 is a side view of the form of the invention shown in Figure 5; and

Figure 7 is a fragmentary view showing the position of the linkage when the tools are raised.

Figure 1:
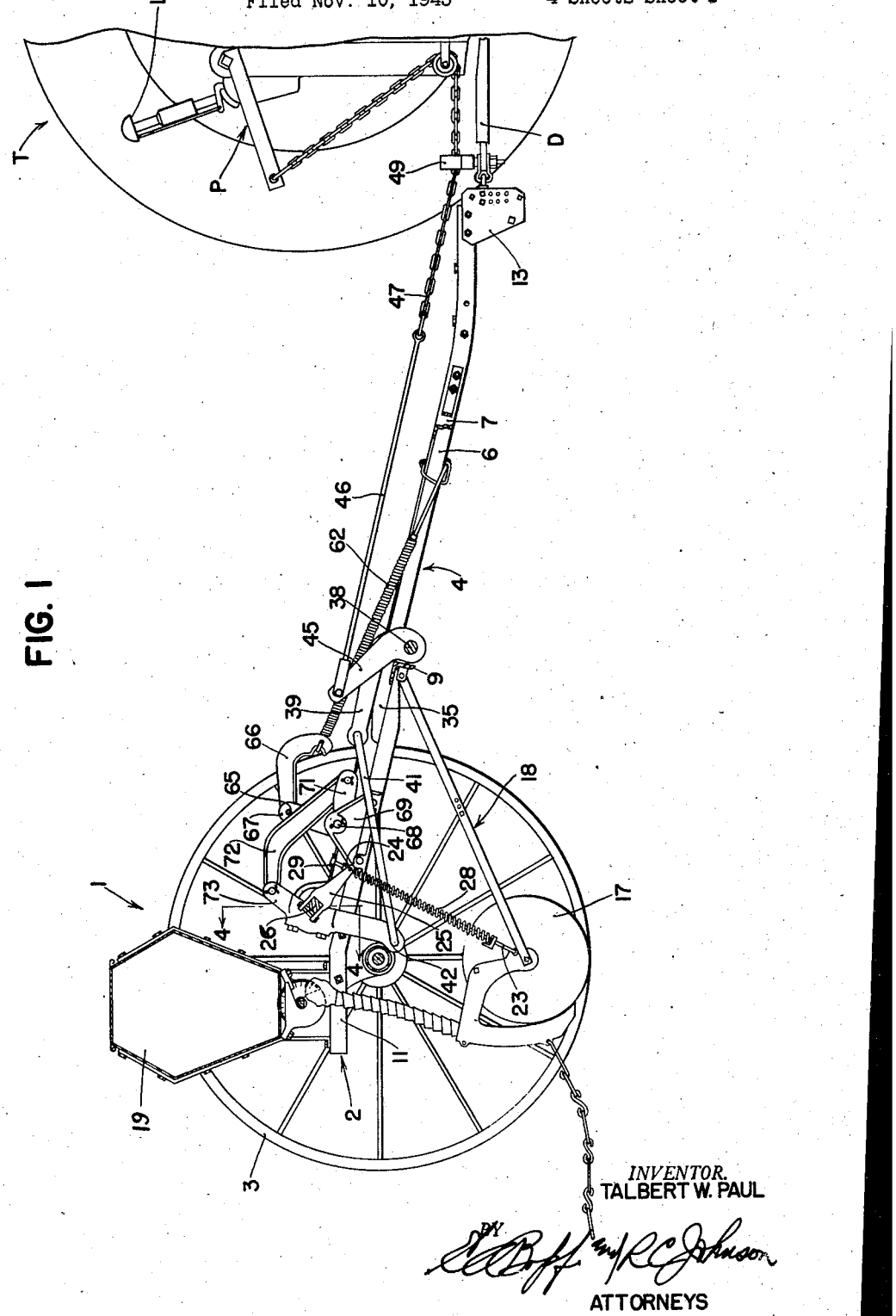
Figure 1 is a side view, with certain parts shown in section, of a tractor-propelled grain drill in which the principles of the present invention have been incorporated.
Figure 2:
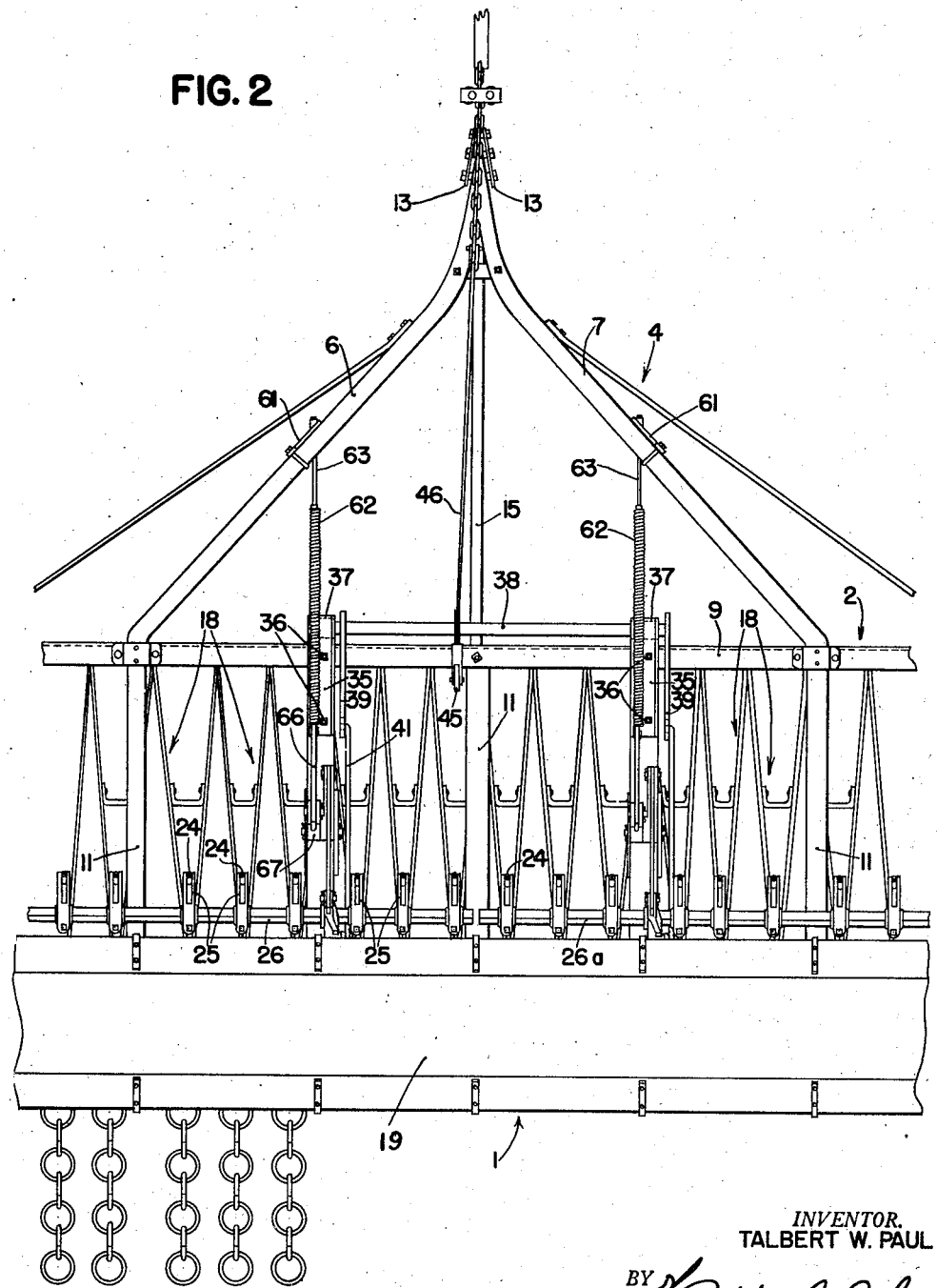
Figure 2 is a plan view of the grain drill shown in Figure 1.

Referring now more particularly to Figures 1 and 2, the first embodiment I have chosen to illustrate the present invention is represented by a grain drill 1 having a main frame 2 supported on ground wheels 3. A hitch frame 4 includes forwardly converging angle bars 6 and 7 which are secured in any suitable manner to the front transverse angle 9 and to certain of the longitudinal cross bars 11 forming a part of the main frame 2. A pair of hitch plates 13 are bolted to the front connected ends of the forwardly converging hitch frame angles 6 and 7, and the lower portion of the hitch plates 13 are connected by a longitudinal draft bar 15 with the central part of the main frame angle 9. The grain drill 1 includes a plurality of furrow openers 17, each connected with the front frame angle 9 by a generally downwardly and rearwardly extending drag frame unit 18 pivoted at its forward end to the frame angle 9. The furrow openers 17 form furrows in the soil for the deposition therein of seed delivered thereto through suitable seed feeding mechanism carried on the under side of a hopper 19. A rod 23 is pivoted at its lower end to the rear portion of each of the drag frames 18 and extends generally upwardly and through a swivel 24 carried at the forward end of a pressure arm 25. The several pressure arms 25 are fixed at their rear ends to a transverse rockshaft or lifting shaft 26 that is journaled in suitable bearing supports carried by the main frame 2. Disposed about each of the lift rods 23 is a pressure spring 28 bearing at its lower end through a suitable abutment against the rod and at its upper end against the swivel 24. A collar 29 is fixed adjustably to the upper end of the rod 23. When the shaft 26 is rocked in one direction the swivel 24 engages the collar 29 and lifts the associated furrow opener 17 into a raised position, and when the lifting shaft 26 is rocked in the other direction the springs 28 are compressed and yieldingly force the furrow openers into their earth working position.

The structure so far described is largely conventional. In the larger sizes of drills there are two pressure shafts, 26 and 26a, as shown in Figure 2, each having a plurality of pressure arms 25 secured thereto. Turning now to the particular feature with which the present invention is concerned, associated with each of the pressure shafts or lifting shafts 26 and 26a is a loading spring unit, together with associated lifting connections, and since each of these units and associated parts is substantially identical with the corresponding part of the other unit, a description of one will suffice.

A bracket 35 is bolted, as at 36, to each of the cross bars 11 adjacent the central portion of the main frame 2 and overhangs the front angle 9 thereof. The overhanging portion of each bracket 35 includes a transverse sleeve 37, the two sleeves 37 forming a journal for a rockshaft 38. An arm 39 is fixed to one end of the rockshaft 38 and is connected through a link 41 with an arm 42 which is fixed to the lift shaft 26. The rockshaft 38 extends across the central portion of the grain drill frame 2 and at its other end carries a similar arm and link arrangement whereby the other lift shaft 26a may be rocked. Any suitable means may be provided for rocking the shaft 38, but in order to illustrate one operative means to that end, I have shown the rockshaft 38 as equipped with an arm 45 that is connected at its upper end by a link 46 with a flexible element 47 extending adjacent the hitch connection between the grain drill 1 and the tractor T. The flexible element 47 is connected at its forward end with a power lift unit P carried by the tractor and controlled by a controlling valve lever L. The chain 47 extends through a roller guide 49 carried by the drawbar D of the tractor.

The present invention is not particularly concerned with the power lift unit since the same may be of any suitable construction, such as that shown in U. S. Patent No. 2,311,516, issued February 16, 1943, to T. Brown et al., or in U. S. patent application, Serial No. 434,256, filed March 11, 1942, by Frank T. Court. Therefore, it will suffice here to state that the power lift unit P is of the type that may be actuated to cause the flexible element 47 and the link 46 connected thereto to be moved through two ranges, the first constituting a depth adjusting range in which the element 47, link 46 and rockshaft 38 may be moved into and held in any one of a number of positions of adjustment, and another range in which the rockshaft 38 may be moved forwardly into a raised or transport position. Such movements of the rockshaft 38 are, of course, transmitted to the pressure shafts 26 and 26a by the links 41 and arms 42, and it will be noted from Figure 1 that by operating the tractor power lift, the rockshafts 26 and 26a may be moved into different positions and, in such positions, caused to act through the pressure springs 28 to force the furrow openers 17 into different positions of varying depths of operation. The pressure springs 28 may, of course, yield to permit the furrow openers to pass over obstructions and the like, but usually, moving the pressure shafts 26 and 26a serves to carry the forward ends of the pressure arms 25 downwardly different amounts resulting in increasing the depth of operation of the furrow openers. Rocking the pressure shafts in the other direction acts through the lift rods 23 to raise all of the furrow openers into a transport position and out of engagement with the ground.

Figure 4:
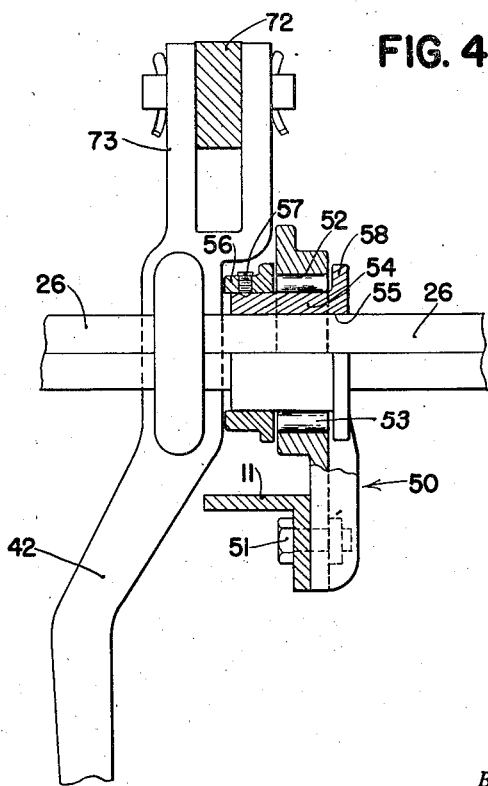
Figure 4 is an enlarged fragmentary section taken generally along the line 4—4 of Figure 1, showing the particular form of bearing support for the pressure shafts.

Each of the pressure shafts 26 and 26a is supported for rocking movement on the grain drill frame 2 by improved bearing means providing for increased ease in rocking the pressure shafts 26 and 26a even when the latter are under considerable pressure. Referring particularly to Figure 4, a bracket 50 is bolted, as at 51, to the adjacent angle 11 of the frame 2 and is provided with a cylindrical bearing surface 52 along which anti-friction rollers 53 are disposed. A bushing 54 having a square opening 55 to receive the pressure shaft 26 (or 26a) is disposed within the opening 52 and serves as an inner race for the rollers 53. The bushing 54 is extended beyond the bracket 50 so as to receive a flanged collar 56 having a set screw 57 by which the collar may be secured to the bushing 54 on the side of the bracket opposite the flange 58 of the bracket 50. The flange 58 and the collar 56 serve to retain the rollers in position.

A bracket 61 is secured to each of the hitch angles 6 and 7. A relatively heavy loading spring 62 is adjustably connected by a screw threaded rod 63 with each bracket 61. The rear end of each loading spring 62 is pivotally connected to a curved link 66 which, at its rear end, is pivotally connected to an arm 67 that is fixed to a short shaft 68 journaled for rocking movement in a bracket 69 fastened to the same frame member 11 to which the associated bracket 35 is bolted. A second arm 71 is fixed to the short shaft 68 and is connected by a curved link 72 to an arm 73 that is fixed to the associated pressure shaft or lift shaft, 26 or 26a.

Figure 3:
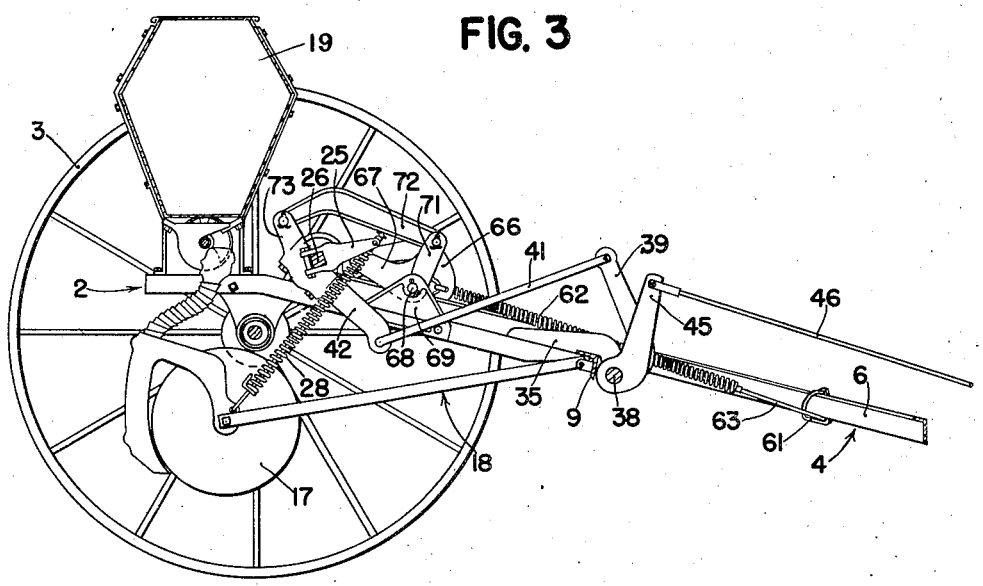
Figure 3 is a view similar to Figure 1, showing the tools in their raised position.

Each loading spring, as well as each lift arm 39, is connected with the associated parts through the above described linkage, and this linkage, according to the principles of the present invention, is arranged in a particular manner so that, when the furrow openers are lowered, the loading springs have their maximum effectiveness so far as holding the furrow openers to their work is concerned, but when the furrow openers are raised, as shown in Figure 3, the linkage is such that the bias of the loading springs is substantially entirely removed from the furrow openers so that when raising the latter into their lifted position, it is unnecessary for the tractor power lift to work against the loading springs. Figure 1 shows the parts in the positions they occupy when the furrow openers are in their lowered or operating position and in which the loading springs are effective to hold the furrow openers in the ground. It will be noted that in this position the arm 71 and link 72 form a toggle which approaches its dead center relation whereby, in effect, the bias of the loading spring is multiplied and the spring therefore serves as a relatively powerful force acting through the several pressure springs 28 to hold the furrow openers in the ground. It will also be noted that the arm 42 is approximately perpendicular with respect to the link 41 and that the latter, together with the arm 39, constitutes a second toggle arranged in an extended position whereby at this stage, a relatively large movement of the arm 39 is required to swing the pressure arms 25 upwardly. In this position, therefore, namely, the working position, the two toggle arrangements just mentioned constitute motion multiplying means whereby, in effect, the bias of the loading spring is multiplied so far as its effect on holding the furrow openers in the ground is concerned and that, in effect, the lifting force, exerted through the lifting link 46 and associated parts, is multiplied by virtue of the toggle 39, 41, so that the furrow openers may be raised even against the action of the loading springs at this stage. In this connection, however, it will be noted that the loading springs act through the pressure springs 28 in holding the furrow openers in the ground, and therefore, at the initial stage of lifting the tools, the relatively great effect of the loading springs is, so far as lifting the tools is concerned, reduced by the reacting bias of the pressure springs 28.

As the lifting progresses, the linkages mentioned above take different positions. Referring now to Figure 3 it will be noted that as the arm 67 swings rearwardly and downwardly, it moves into a substantially dead-center relationship with respect to the link 66. The arm 67 and the link 66 therefore constitute a toggle arrangement in which the effectiveness of the bias exerted by the spring 62 is substantially reduced to zero. It will be noted that the link 66 is curved so as to clear the shaft 68 and permit the pivot 65 connecting the link 66 and arm 67 to move into a position generally behind the shaft 68.

Thus, I have provided spring loading means connected through force multiplying linkage when the tools are in their lowered position for effectively holding them in that position, and in which the lifting mechanism is connected with the tools, also through force multiplying linkage when the tools are lowered, whereby only a normal amount of lifting effort need be exerted to start the lifting of the tools, even against the bias of the loading springs. It will also be noted that the linkages are arranged so that after the lifting action has progressed through a part of its range, preferably, about that corresponding to the upward movement of the pressure arms 25, as the pressure springs 28 expand, until the swivels 24 come up to engagement with the collars 29, the bias of the loading springs is, for all practical purposes, substantially entirely removed so that the lifting progresses to the transport position without material interference by the loading springs. It will also be seen that the connections are such that the pressure springs 28, acting downwardly against the ground through the furrow openers 17 and upwardly against the pressure arms 25, materially assist the raising mechanism when first starting the lifting of the tools against the bias of the loading springs but that they do not in any way interfere with the action of the loading springs in applying relatively powerful force tending to hold the furrow openers in the ground.

A modified form of the present invention is shown in Figures 5 and 6. In this form of the invention the flexible element 47a from the tractor power lift P is extended rearwardly between the hitch plates 13 and at its rear end is connected with a plate 85 which, as best shown in Figure 6, is provided with clips 86 and a pair of rollers 87 movable along the underside of the longitudinal draft bar 15, which preferably is of T-section. A cross bar 89 is placed above the draft bar 15 and is apertured at its ends to receive the rear ends of a pair of forwardly converging pull links 91 and 92. The forward ends of the links are connected to the plate 85. The outer ends of the bar 89, which serves as a spacer, are provided with brackets 93, and each bracket receives the forward end of a lifting link 94. The rear end of each lifting link 94 is connected directly to the lower end of the associated arm 42. The other parts of the lifting mechanism are identical with those described above, and hence the same reference numerals have been employed. Clips 96 are fixed to the underside of the spacing bar 89 and slide along the draft bar 15, as best shown in Figure 6. It will be noted that in this form of the invention the rockshaft 38 (Figure 2) and associated parts, including the second toggle link arrangement 39, 41, have been omitted and the lifting pull applied directly to the lower ends of the lifting arms 42. While this construction entails a somewhat proportionately greater power requirement at the beginning of the lifting movement, due to the absence of the advantage of the toggle 39, 41 of Figure 1, it has been found to be entirely adequate for the lighter machines, especially where improved bearing means for supporting the pressure shafts, 26 and 26a, are employed. Like the form of the invention shown in Figure 1, when the tools are raised the arm and link means 66, 67 move into substantially a dead-center relation so that in the latter part of the range of its lifting movement the lifting means, including the pull links 94, is not required to exert much, if any, force so far as overcoming the springs 62 is concerned. It will also be noted from Figure 6 that when the tools are in their lowered position, the springs 62 have their greatest effectiveness in holding the tools in the ground due to the fact that the toggle linkage 71, 72 moves into substantially a dead-center relationship. Thus, the action of the two toggle linkages 66, 67 and 71, 72, particularly in conjunction with the pressure springs 28, is to provide substantially a constant load for the power lift P, with no objectionable peaks, yet the tools are held in their soil working position with adequate force but without overloading the power lift when raising the tools. This arrangement is also present in the form of the invention shown in Figure 1.

I claim:

1. An agricultural implement having frame means, earth working tool means connected therewith for movement into and out of a lowered operating position, a bell crank pivoted on said frame means, a spring anchored at one end to said frame means, a link connecting the other end of said spring with one arm of the bell crank, means including a second link operatively connecting the other bell crank arm with said tool means, and means for raising and lowering said tool means, said second link approaching a substantially dead center relation with the associated bell crank arm when the tool means is lowered, whereby the spring has maximum effectiveness in holding the tool means in lowered position, and said first mentioned link approaching a substantially dead center relationship with the associated bell crank arm when the tool means is raised, whereby said spring offers reduced resistance to the raising of said tool means by said raising and lowering means.

2. An agricultural implement as defined in claim 1, further characterized by said raising and lowering means connected with said bell crank through toggle linkage.

3. An agricultural implement having frame means, a plurality of furrow openers movable generally vertically relative thereto, a lifting rockshaft mounted on the frame means and having a plurality of pressure arms fixed thereto, and a pressure spring between each furrow opener and the associated pressure arm, a bell crank pivoted on the main frame, a link connecting one arm of the bell crank with said rockshaft, and a loading spring anchored to said frame means and connected to the other arm of the bell crank, said one arm of the latter and said link being arranged angularly so as to serve as a toggle and to approach a substantially dead center relation when said furrow openers are in their lowered position, whereby said loading spring acts with increased mechanical advantage through said pressure springs to hold said furrow openers in the ground.

4. The invention set forth in claim 3, further characterized by link means connecting the loading spring with said other bell crank arm, the latter and said link means approaching a dead center relationship when the furrow openers are raised, whereby in this position of the furrow openers the effect of said loading spring on the furrow openers is reduced.

5. The invention set forth in claim 3, further characterized by means having a toggle connection with said rockshaft for lifting said furrow openers into a transport position against the action of said loading spring.

6. The invention set forth in claim 3, further characterized by means having a toggle connection with said rockshaft for lifting said furrow openers into a transport position against the action of said loading spring, said toggle connection being arranged so as to act with increased mechanical advantage against said rockshaft when the furrow openers are in a lowered position and the loading spring acts with increased mechanical advantage tending to hold the furrow openers in a lowered position.

7. An apparatus for moving an earth-working tool into and out of the ground, comprising a loading spring, means connected between said spring and the tool providing a toggle linkage including relatively movable parts, one connected with said spring and the other connected with said tool, movable into such angular position as to provide a progressively increasing mechanical advantage for the spring action as the tool approaches its position in the ground; movable means for raising said tool out of the ground against the action of said spring, and means connected between said movable means and said tool providing a second toggle linkage including relatively movable parts, one connected with said movable means and the other with said tool, said last mentioned parts being movable into such angular position as to provide an increased mechanical advantage for said raising means when the tool is in the ground, which latter mechanical advantage progressively decreases as the tool is raised.

8. An agricultural implement comprising frame means, an earth-working tool, spring means acting between said frame means and said tool for forcing the tool into the ground, means for raising the tool into a transport position against the action of said spring means, and means connected between said raising means and said tool, comprising a bell crank pivoted on said frame means and having a pair of angularly related arms, link means connecting one of said arms with said raising means, a second link means connecting the other arm of said bell crank with said tool, and the link means associated therewith moving into an extended position when the tool means is in the ground and the other link means extending approximately perpendicular with respect to the bell crank arm connected therewith, whereby there is provided an increased mechanical advantage for said raising means when the tool is in the ground, which latter mechanical advantage progressively decreases as the tool is raised into its transport position.

9. In an agricultural implement having earth-working tool means movable into and out of operating position, means for forcing said tool means into the soil comprising a spring, a rockable arm connected therewith, and toggle linkage connecting said arm with said tool means and adapted to approach a substantially dead center relation when said tool means reaches its full depth, whereby said spring means has its greatest effectiveness toward holding the tool means in the ground, and mechanism for raising said tool means out of the ground against the action of said spring and including toggle linkage disposed substantially in a dead center relationship when the tool means is lowered, whereby the effectiveness of said raising mechanism in raising said tool means from its lowered position against the action of said spring means is multiplied.

10. An agricultural implement comprising frame means, earth working tool means movably connected therewith, a member movably mounted on said frame means and connected through spring means for forcing said tool means into the ground, a second spring means, linkage connecting the second spring means with said member and arranged so that as said tool means enters the ground said second spring means acts to apply an increasing force against said tool means through said first spring means, thereby biasing the latter, and tool lifting means comprising a second movable member and linkage connecting said second movable member with said first mentioned member, said linkage being arranged so that the mechanical advantage at which said second movable member acts against said first movable member is greatest when the effective force exerted by said second spring means is the greatest.

11. An agricultural implement comprising frame means, tool means movable relative thereto between raised and lowered positions, means for raising and lowering said tool means, a loading spring anchored at one end to said frame means, and a pair of toggle linkages, one connected between said frame means and said raising and lowering means, and the other connected between the frame means and the other end of said loading spring, said two toggle linkages including interconnected parts which move together, said parts being so disposed, one with respect to the other, that when the tool means is raised said second toggle linkage approaches a substantially dead center position and when the tool means is lowered, the first mentioned toggle means approaches a substantially dead center position.

TALBERT W. PAUL.

REFERENCES CITED

The following references are of record in the file of this patent:

UNITED STATES PATENTS

| Number | Name | Date |
|---|---|---|
| 2,123,555 | Morkovski | July 12, 1938 |
| 2,298,539 | Mott | Oct. 13, 1942 |
| 2,298,540 | Mott | Oct. 13, 1942 |